(12) United States Patent
Zu et al.

(10) Patent No.: US 10,658,914 B2
(45) Date of Patent: May 19, 2020

(54) MAGNETICALLY BALANCING GUIDED LINEAR VIBRATION MOTOR

(71) Applicant: GOERTEK INC., WeiFang Shandong (CN)

(72) Inventors: Fenglei Zu, WeiFang (CN); Chunfa Liu, WeiFang (CN)

(73) Assignee: GOERTEK INC., WeiFang, Shandong (CN)

( * ) Notice: Subject to any disclaimer, the term of this patent is extended or adjusted under 35 U.S.C. 154(b) by 119 days.

(21) Appl. No.: 15/752,187

(22) PCT Filed: Dec. 15, 2015

(86) PCT No.: PCT/CN2015/097468
§ 371 (c)(1),
(2) Date: Feb. 12, 2018

(87) PCT Pub. No.: WO2017/049779
PCT Pub. Date: Mar. 30, 2017

(65) Prior Publication Data
US 2018/0241295 A1    Aug. 23, 2018

(30) Foreign Application Priority Data

Sep. 23, 2015 (CN) .......................... 2015 1 0613639

(51) Int. Cl.
*H02K 33/18* (2006.01)
*H02K 33/16* (2006.01)
(Continued)

(52) U.S. Cl.
CPC ............. *H02K 33/18* (2013.01); *B06B 1/045* (2013.01); *H02K 33/14* (2013.01); *H02K 33/16* (2013.01); *H02K 35/02* (2013.01)

(58) Field of Classification Search
CPC ............ H02K 5/04; H02K 5/24; H02K 33/00; H02K 33/02; H02K 33/14; H02K 33/16; H02K 33/18; B06B 1/045
(Continued)

(56) References Cited

U.S. PATENT DOCUMENTS 6,326,706 B1 * 12/2001 Zhang .................. F04B 35/045
310/12.24
2006/0226713 A1 * 10/2006 Lehr ...................... F16C 29/02
310/12.04
(Continued)

FOREIGN PATENT DOCUMENTS

| CN | 1592049 A | 3/2005 |
| CN | 201577016 U | 9/2010 |

(Continued)

OTHER PUBLICATIONS

International Search Report, State Intellectual Property Office of the P.R. China, dated Jun. 29, 2016.
(Continued)

*Primary Examiner* — Alfonso Perez Borroto
*Assistant Examiner* — Rashad H Johnson
(74) *Attorney, Agent, or Firm* — Holzer Patel Drennan

(57) ABSTRACT

A magnetic balance guided linear vibration motor comprising a housing (1, 2), a vibrator, and a stator fixedly connected with the housing. The vibrator comprises a counterweight (31) and a vibrating block embedded and fixed in the counterweight, wherein a pair of first balancing magnets (61a, 61b) are respectively arranged on vertical sidewalls at two ends of the counterweight, second balancing magnets (62a, 62b) corresponding to the first balancing magnets are respectively arranged on the housing at positions corresponding to the two ends of the counterweight, and the second balancing magnets and the corresponding first bal-
(Continued)

ancing magnets are attracted to each other. The vibration motor provides the vibrator with vibration balance in a motor vibration space, overcomes the problem of wearing, deformation and balance error and the like due to motor mechanical balance means, and reduces motor noise, thus increasing the product quality and stability of the motor.

10 Claims, 5 Drawing Sheets

(51) Int. Cl.
  *B06B 1/04* (2006.01)
  *H02K 33/14* (2006.01)
  *H02K 35/02* (2006.01)

(58) Field of Classification Search
  USPC ............... 310/15, 16, 17, 25, 28, 36, 37, 51
  See application file for complete search history.

(56) References Cited

U.S. PATENT DOCUMENTS

| | | | |
|---|---|---|---|
| 2010/0291813 | A1 | 11/2010 | Kotlyar |
| 2011/0198948 | A1* | 8/2011 | Keisuke ................. B06B 1/045 310/25 |
| 2012/0112565 | A1* | 5/2012 | Lee ......................... B06B 1/045 310/20 |
| 2012/0169148 | A1* | 7/2012 | Kim ....................... H02K 33/16 310/25 |
| 2014/0054983 | A1* | 2/2014 | Moon .................... H02K 33/16 310/28 |
| 2017/0317568 | A1* | 11/2017 | Ishii ....................... H02K 33/02 |
| 2017/0354992 | A1* | 12/2017 | Katada ................... H02K 33/16 |
| 2018/0183313 | A1* | 6/2018 | Katada ............... H02K 41/0356 |

FOREIGN PATENT DOCUMENTS

| | | |
|---|---|---|
| CN | 202167973 U | 3/2012 |
| CN | 102570764 A | 7/2012 |
| CN | 102684445 A | 9/2012 |
| CN | 104617735 A | 5/2015 |
| CN | 205092750 U | 3/2016 |
| JP | H08116658 A | 5/1996 |
| KR | 20110027173 A | 3/2011 |
| WO | 2010123288 A2 | 10/2010 |

OTHER PUBLICATIONS 201510613639.1 Office Action, State Intellectual Property Office of the P.R. China, dated Apr. 1, 2017.

* cited by examiner

MAGNETICALLY BALANCING GUIDED LINEAR VIBRATION MOTOR

TECHNICAL FIELD

The present application relates to technical field of consumer electronics, and more particularly relates to a magnetic balance guided linear vibration motor used in portable consumer electronic products.

BACKGROUND

With the development of communication technology, portable electronic products such as mobile phones, handheld game machines or handheld multimedia entertainment apparatus enter people's lives. In these portable electronic products, micro-vibration motors are generally used to make system feedbacks, such as mobile phone notifications on incoming calls, game machine vibration feedbacks and the like. However, with the development trend of thin and lightweight electronic products, a variety of internal components thereof also need to adapt to this trend, and micro-vibration motor is no exception.

The existing micro-vibration motor generally comprises an upper cover, a lower cover which forms a vibration space with the upper cover, a vibrator (including a counterweight and a permanent magnet) performing a linear reciprocating vibration by taking a guide shaft penetrating the counterweight as a vibration reference in the vibration space, a elastic support connecting to the upper cover and driving the vibrator to perform a reciprocating vibration, and a coil positioned a distance below the vibrator.

However, in the configuration of the above-described micro-vibration motor, the balance of the vibrator performing a linear reciprocating vibration in the vibration space is maintained only by the cooperation of the guide shaft, a spring sleeved on the guide shaft, and a guide hole corresponding to the guide shaft, such as the horizontal linear vibrator involved in Chinese Patent Application Publication No. CN01958629A. This vibration balance which is maintained only by mechanical forces such as shaft and hole as well as spring tends to generate vibration imbalance due to reasons such as mechanical wear and deformation and the like, thereby affecting the product quality of the micro-vibration motor.

SUMMARY

In view of the above problems, the purpose of the present application is to provide a magnetic balance guided linear vibration motor which maintains the vibration balance of the vibrator in the vibration space by means of attractive forces between permanent magnets so as to overcomes the problems of wear and deformation due to mechanical balance means and improves product stability.

The magnetic balance guided linear vibration motor provided by the application comprises a housing, a vibrator and a stator fixedly connected to the housing, wherein the vibrator comprises a counterweight and a vibrating block embedded and fixed in the counterweight, wherein a pair of first balancing magnets are respectively provided on vertical sidewalls at two ends of the counterweight, and a pair of second balancing magnets corresponding to the first balancing magnets are respectively provided on the housing at positions corresponding to the two ends of the counterweight, and the second balancing magnets and the corresponding first balancing magnets are attracted to each other.

Preferably, a buffer cushion is provided on the housing at a position between the second balancing magnets and the first balancing magnets.

Preferably, balance positioning spaces are respectively provided at corners where the two ends of the counterweight are in contact with the two vertical sidewalls, and the first balancing magnets are fixed in the balance positioning space in manner of glue coating or laser welding.

Preferably, vibration guide shafts and limiting springs are provided on centers of the two ends of the counterweight, and the limiting springs are sleeved on the vibration guide shafts respectively, and limiting mechanisms are provided on the housing at positions corresponding to the vibration guide shafts and the limiting springs, and the limiting springs are restricted between the counterweight and the limiting mechanisms, furthermore, guide holes for reciprocating movements of the vibration guide shafts are provided in the limiting mechanisms, and the second balancing magnets are disposed symmetrically with the guide holes, and the second balancing magnets are disposed in the limiting mechanism or disposed between the limiting mechanism and the first balancing magnets.

Preferably, the first balancing magnets and the second balancing magnets are permanent magnets, electromagnets, or any combination of permanent magnets and electromagnets.

An avoidance structure for avoiding the stator is provided in the middle of the counterweight, and a groove for accommodating the vibrating block is provided on a center of the avoidance structure on the counterweight, and the vibrating block is fixed in the groove in manner of glue coating or laser welding.

Preferably, the vibrating block comprises at least three permanent magnets disposed adjacent to each other and adjacent ends of the permanent magnets have the same polarities of adjacent ends, and magnetic yokes are provided between adjacent permanent magnets, and the stator comprises coils and magnetic cores disposed in the coils respectively, and the magnetic yokes and the magnetic cores are alternately arranged, and magnetization directions of the permanent magnets are perpendicular to axial directions of the coils of the stator.

Preferably, horizontal distances between the magnetic yokes and the magnetic cores corresponding to the magnetic yokes are within a numerical range of 0.1 mm to 0.3 mm, and the magnetic cores are all located at positions where the corresponding magnetic yokes are far away from a center of the vibrator.

Preferably, the counterweight is a tungsten steel block, a nickel steel block or a nickel-tungsten alloy block.

Preferably, the magnetic balance guided linear vibration motor further comprises a flexible circuit board, and the stator is fixedly connected to the housing through the flexible circuit board, and a coil lead of the stator is connected with an external circuit through a circuit on the flexible circuit board.

The magnetic balance guided linear vibration motor according to the present application can utilizes the mutually attracting magnet combinations respectively provided on the vibrator and the housing to provide the vibrator with vibration balance in a motor vibration space, so as to achieve the magnetic balance guide effect and overcome the problem of wearing, deformation and balance error and the like due to motor mechanical balance means, and reduce motor noise, thus increasing the product quality and stability.

In order to achieve the above and related purposes, one or more aspects of the present application comprise the features that will be described below in detail and particularly set forth in claims. The following description and drawings illustrate in detail certain illustrative aspects of the present application. However, these aspects are merely some of the various ways in which the principles of the present application can be employed. In addition, the present application is intended to comprise all such aspects and their equivalents.

BRIEF DESCRIPTION OF THE DRAWINGS

The other purposes and results of the present application will become more apparent and more readily appreciated through the following descriptions in connection with the accompanying drawings and contents of claims, along with more fully understood of the present application. In the drawings:

Figure 1:
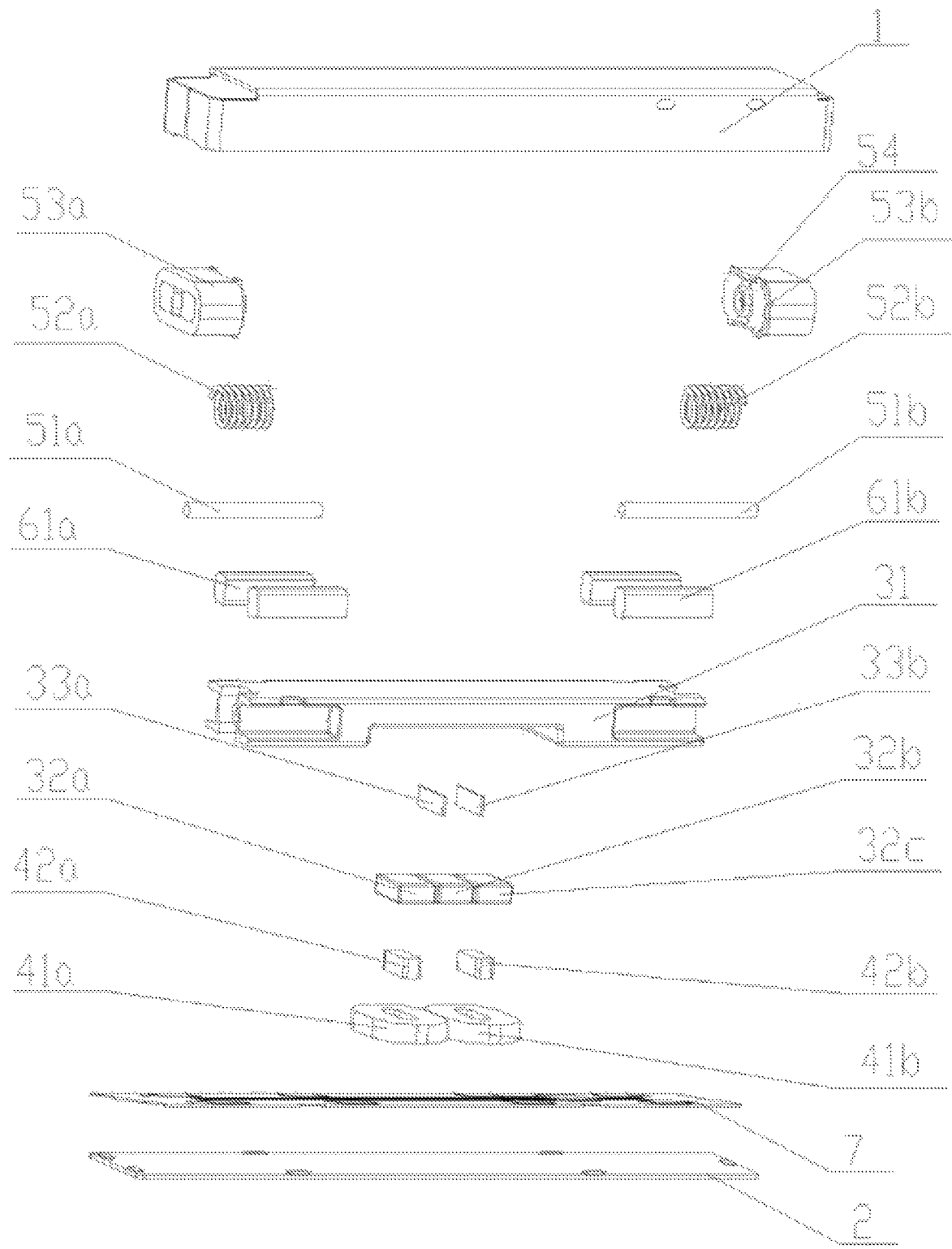
FIG. 1 is a schematic diagram of an explosion structure of a magnetic balance guided linear vibration motor according to a first embodiment of the present application.

In the drawings, upper case 1, rear cover 2, counterweight 31, permanent magnet 32a, 32b, 32c, magnetic yoke 33a, 33b, coil 41a, 41b, magnetic core 42a, 42b, vibration guide shaft 51a, 51b, limiting spring 52a, 52b, limiting mechanism 53a, 53b, shaft sleeve 54, first balancing magnet 61a, 61b, second balancing magnet 62a, 62b, flexible circuit board 7.

The same reference numbers indicate similar or corresponding features or functions in all of the drawings.

DETAILED DESCRIPTION

In the following description, for the purposes of illustration, numerous specific details are explained in order to provide a thorough understanding of one or more embodiments. However, it is apparent that these embodiments can be implemented without these specific details. In other examples, well-known structures and apparatus are illustrated in the form of block diagrams in order to facilitate describing one or more embodiments.

In order to solve the problems of balance error, mechanical wear and deformation and the like caused by the mechanical vibration balance means in the existing micro-vibration motor structure, in the magnetic balance guided linear vibration motor provided by the present application, a pair of mutually attracting magnets are respectively fixed on the vibrator and the housing on the basis of the existing mechanical balance, and the principle of permanent magnets that opposite polarities mutually attract each other are used to provide balance between the vibrating vibrator and the relatively stationary housing.

The particular embodiments of the present application will be described in detail in combination with the accompanying drawings in the following.

Figure 2:
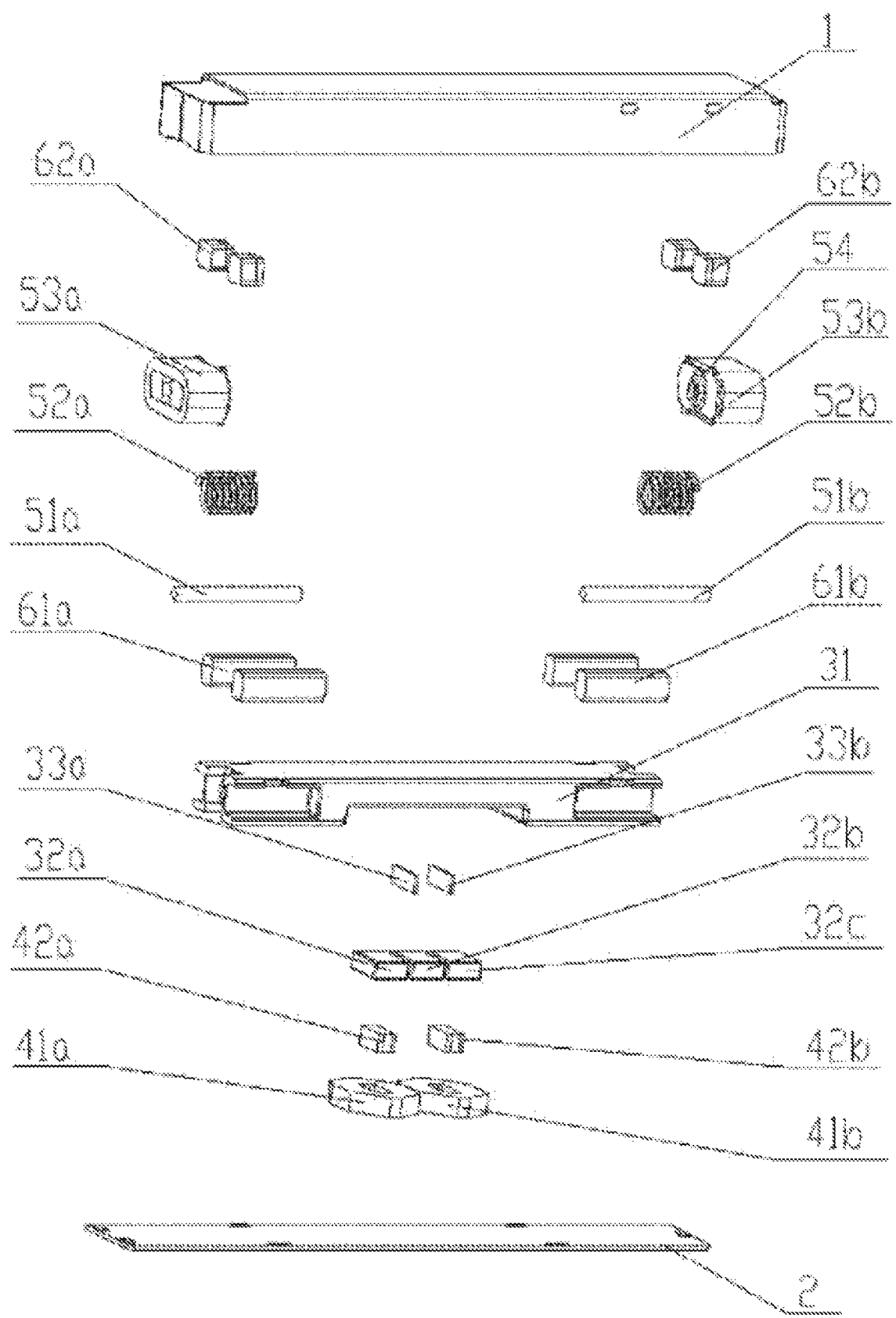
FIG. 2 is a schematic diagram of an explosion structure of a magnetic balance guided linear vibration motor according to a second embodiment of the present application.
Figure 3:
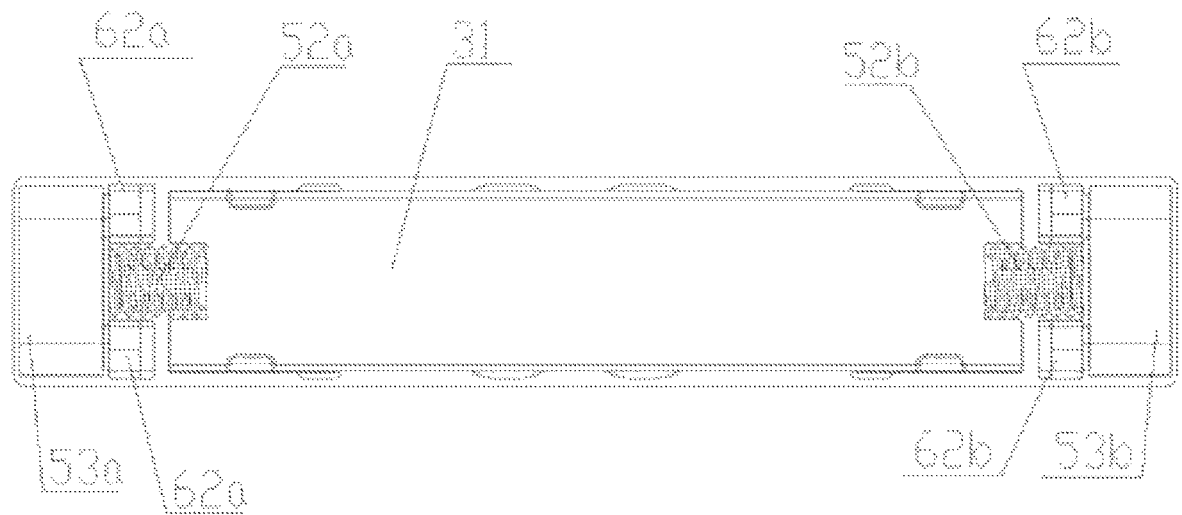
FIG. 3 is a schematic diagram of a partially assembled structure of the magnetic balance guided linear vibration motor according to the second embodiment of the present application.

FIG. 1 shows an entire explosion structure of a magnetic balance guided linear vibration motor according to a first embodiment of the present application. FIG. 2 and FIG. 3 respectively show an entire explosion structure and a partially assembled structure of a magnetic balance guided linear vibration motor according to a second embodiment of the present application.

As shown in FIG. 1, FIG. 2 and FIG. 3, the magnetic balance guided linear vibration motor of the present embodiment mainly comprises a housing, a vibrator and a stator fixedly connected to the housing, wherein the stator and the vibrator are arranged in a vertical direction. The housing comprises an upper case 1 and a back cover 2, and the vibrator comprises a vibrating block matching with the stator and a counterweight 31 fixedly connected with the vibrating block. The vibrating block comprises three permanent magnets 32a, 32b, 32c disposed adjacent to each other and magnetic yokes 33a and 33b respectively disposed between the adjacent permanent magnets, and the stator comprises two coils 41a, 41b disposed corresponding to the vibrator and magnetic cores 42a, 42b disposed in the coils respectively. The magnetic yokes and the magnetic cores are alternately arranged, and each of the magnetic cores is located at a position where the corresponding magnetic yoke is far away from a center of the vibrator. The "corresponding" refers to magnetic core/magnetic yoke which can influence each other and change a direction of magnetic lines of flux. In the illustration, the magnetic yokes and the magnetic cores are alternately arranged in an order of the magnetic core 42a, the magnetic yoke 33a, the magnetic yoke 33b and the magnetic core 42b, wherein the magnetic core 42a is corresponding to the magnetic yoke 33a, and the magnetic yoke 33b is corresponding to the magnetic core 42b.

Figure 4A:
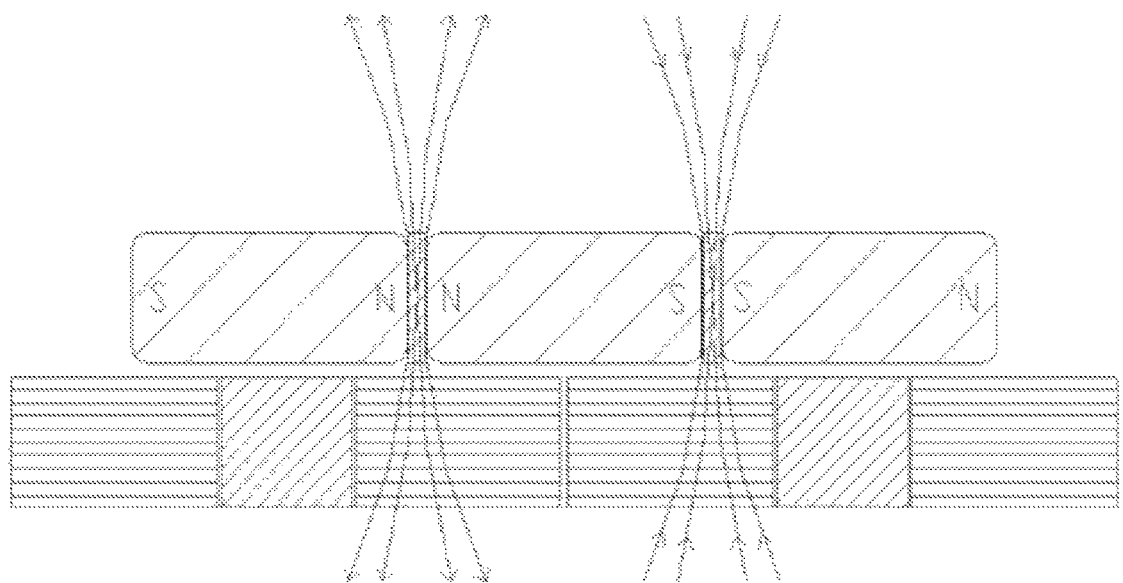
FIG. 4a and FIG. 4b are schematic diagrams of a combined structure of a vibrating block and a stator according to the first and second embodiments of the present application respectively.
Figure 4B:
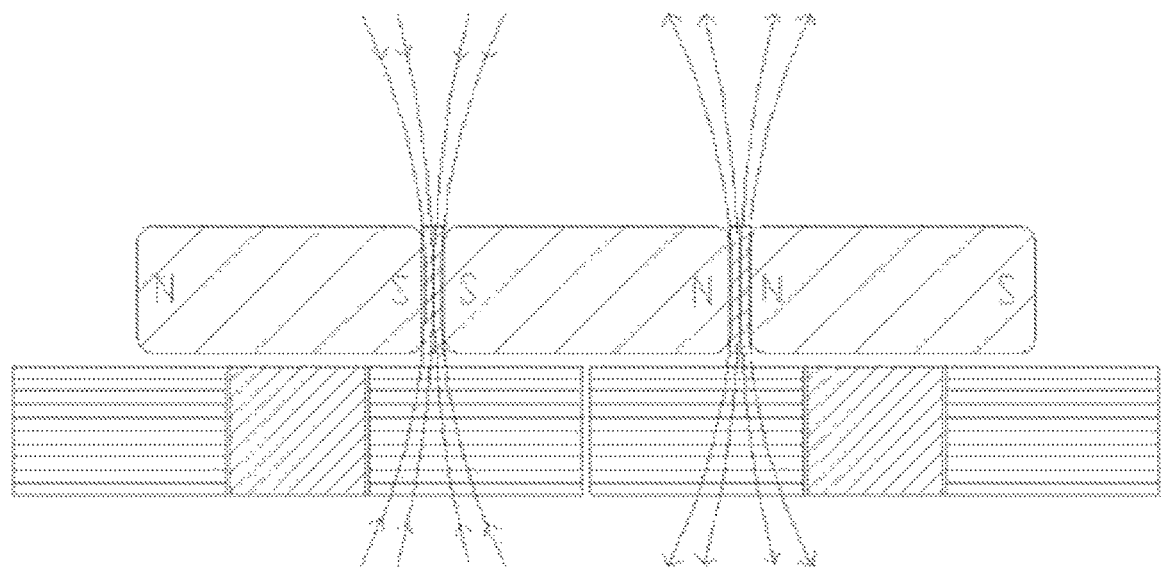

Wherein, the combination structure of the vibrating block and the stator according to the first and second embodiments of the present application are illustrated in FIG. 4a and FIG. 4b. In three permanent magnets disposed adjacent to each other, each of the permanent magnets has a same polarity as an adjacent end of an adjacent permanent magnet, i.e., the permanent magnets are arranged in the order of S-N, N-S and S-N (as shown in FIG. 4a) or N-S, S-N and N-S (as shown in FIG. 4b), and the magnetic yokes are disposed between the adjacent permanent magnets, and a magnetization direction of the permanent magnets is perpendicular to an axis direction of the coils of the stator. Herein, the axis direction of the coil is a direction in which central axes of the coil and the magnetic core in the coil are located. In the embodiment shown in FIG. 4a and FIG. 4b, the magnetization direction of the magnets is a horizontal direction, and the axis direction of the coils is a vertical direction. Since a repulsive force will be generated between two adjacent ends with same polarity of two permanent magnets, magnetic lines of flux of the permanent magnets can intensively pass through the magnetic yokes between two adjacent permanent magnets and the coils arranged below the vibrating block, so as to increase the magnetic flux passing through the coil as much as possible.

Figure 5:
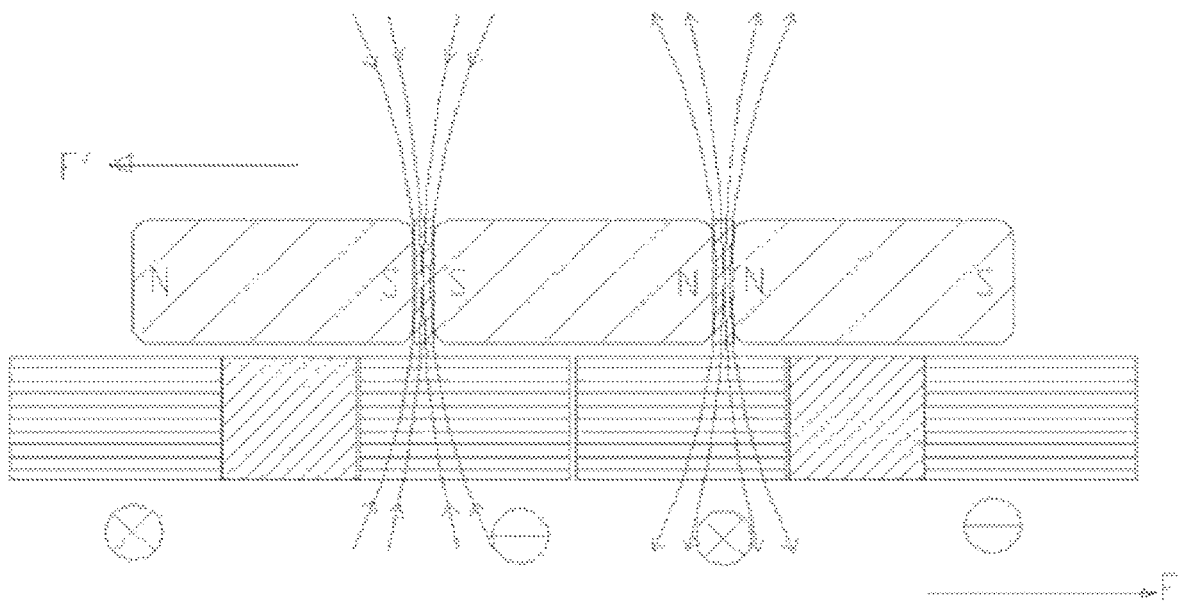
FIG. 5 is a schematic diagram of an operation principle of the magnetic balance guided linear vibration motor according to the first and second embodiments of the present application.

In the following, the operation principle of the linear vibration motor of the present application will be briefly described by taking FIG. 5 as an example. According to a left hand rule that determining a force direction of a energized conductor in a magnetic field, stretch out the left hand, makes the thumb to be perpendicular to the remaining four fingers and the left hand and the thumb to be in the same plane with the palm, then make the magnetic induction line to enter from the palm and make the four fingers to point to the current direction, at this time, the direction pointed by the thumb is the direction of the ampere force applied to the electrifying wire in the magnetic field. Assuming the direction of the current in the coil as follows, the current direction indicated as "⊖" in the drawing is inwards perpendicular to the paper, and the current direction indicated as "⊗" in the drawing is outwards perpendicular to the paper, if the first coil is "⊗ and ⊖", then the second coil must also be "⊗ and ⊖", in this way all of the coil will subject to a force towards right F. Since the coil is stationary, the permanent magnets will subject to a force towards left F' based on the relationship between force and reaction force. In this way, the permanent magnet subjecting to a pushing force towards left will bring the counterweight to perform a leftward translational movement together, so as to press the spring on the left side of the counterweight and stretch the spring on the right side of the counterweight. Similarly, when the current direction changes, according to the left hand rule, the direction of the magnetic field force F applied to the coil is leftward. However, since the coil is stationary, the permanent magnet is subjected to an acting force F' whose direction is opposite to the force F and magnitude is same as the force F, and the permanent magnet subjecting to a pushing force towards right will bring the counterweight to perform a rightward translational movement together, meanwhile causing the springs on two ends of the counterweight continue to be stretched/extruded after restoring to the original state from extruded/stretched state. The above-described movements alternately perform so that the vibrator comprising the counterweight and the vibrating block consisting of the permanent magnets and the magnetic yokes performs a reciprocate movement in a direction parallel to a plane in which the stator is installed.

In order to provide a stable magnetic balance guide for the motor, the present application is further provided with a magnetic balance guide mechanism, and the magnetic balance guide mechanism comprises a pair of first balancing magnets 61a, 61b disposed respectively on vertical sidewalls of two ends of the counterweight 31, correspondingly, a pair of second balancing magnets corresponding to the first balancing magnets 61a and 61b are also respectively provided on the housing at positions corresponding to the ends of the counterweight 31, and the second balancing magnets 62a, 62b and the corresponding first balancing magnets 61a, 61b attract to each other.

Since two pairs of first balancing magnets 61a, 61b are respectively fixed on two ends of the counterweight 31 and two pairs of second balancing magnets mutually attracted with the two pairs of first balancing magnets 61a and 61b are respectively fixed on an inner wall of the housing, i.e., two pairs of magnets capable of applying positioning attractive force to two ends of the vibrator vibrating in the space are fixedly provided on two ends of the vibrating space on the housing, in this way, during the vibration of the vibrator, the four corners of the vibrator will be subjected to the directional attractive force on the corresponding four corners of the vibration space. When the vibrator is deflected, this attraction force will be transformed into a restoring force opposite to the deflection direction, so as to provide magnetic balance guide for vibration of the vibrator in the vibration space. This magnetic balance guide will neither generate deformation nor generate wear, so that has higher accuracy and stability in comparison with the existing mechanical balance guiding means.

In the above design of the magnetic balance guide mechanism, the first balancing magnets embedded in the four corners of the counterweight may also be called as moving magnets. In order to maintaining balance, the moving magnets must be symmetrically embedded in the four corners of the counterweight. Meanwhile, it is preferred to ensure that the moving magnets have larger magnetic product energy to guarantee the magnitude of the balance. In the same way, the second balancing magnets arranged on two sides of the counterweight and fixed on the housing can also be fixed magnets. The distance between the fixed magnets and the moving magnets should be as small as possible to guarantee a sufficient balance force. Meanwhile, it must be considered to vacate the vibration space.

In order to ensure that the balance forces are symmetrical on two sides of the magnetic balance guide mechanism, the consistency of each magnet (including fixed magnet and moving magnet) and the consistency of a assembly distance should be guaranteed. During the specific application, in order to reduce manufacturing complexity, it is also possible to add electromagnets at two ends of the fixed magnet to adjust the asymmetry of the balance force applied to the vibrating block during the vibration.

In addition, the magnetic balance guided linear vibration motor provided by the present application is further provided with a mechanical balance mechanism. The mechanical balance mechanism comprises vibration guide shafts 51a, 51b disposed at centers of the two ends of the counterweight 31, limiting springs 52a, 52b sleeved on the vibration guide shafts, and limiting mechanisms 53a, 53b disposed at non-fixed ends of the vibration guide shafts, and the end surfaces of the limiting mechanisms opposite to the vibration guide shafts are provided with guide holes for reciprocating movements of the vibration guide shafts. The vibration guide shafts in the mechanical balance mechanism may be fixedly connected to the counterweight or fixedly connected to the housing. Correspondingly, the limit mechanisms, which provide the guide holes for the non-fixed ends of the vibration guide shafts, are fixedly connected to the housing or the counterweight, and the limiting springs are restricted between the end surfaces that the vibration guide shafts are fixed to the housing or the counterweight and the limiting mechanism.

The difference between the first embodiment and the second embodiment described above is that, the second balancing magnets 62a and 62b are individually provided between the limiting mechanisms 53a, 53b and the first balancing magnets 61a, 61b in the second embodiment, while the second balancing magnets and the limiting mechanisms 53a, 53b are integrally configured components in the first embodiment. That is to say, in the first embodiment, the limiting mechanisms 53a, 53b are components common to the magnetic balance mechanism and the mechanical balance mechanism in the motor. In contrast, in the second embodiment, the limiting mechanisms 53a, 53b are only components of the mechanical balance mechanism, and the magnetic balance mechanism is a mechanism independent of the mechanical balance mechanism.

For the convenience of description, in the following description of the embodiments, the technical solution of the present application will be further described by taking the magnetic balance guided linear vibration motor having an independent magnetic balance mechanism shown in the second embodiment as an example. However, the magnetic balance guided linear vibration motor of the first embodiment can also achieve these technical solutions.

Figure 6:
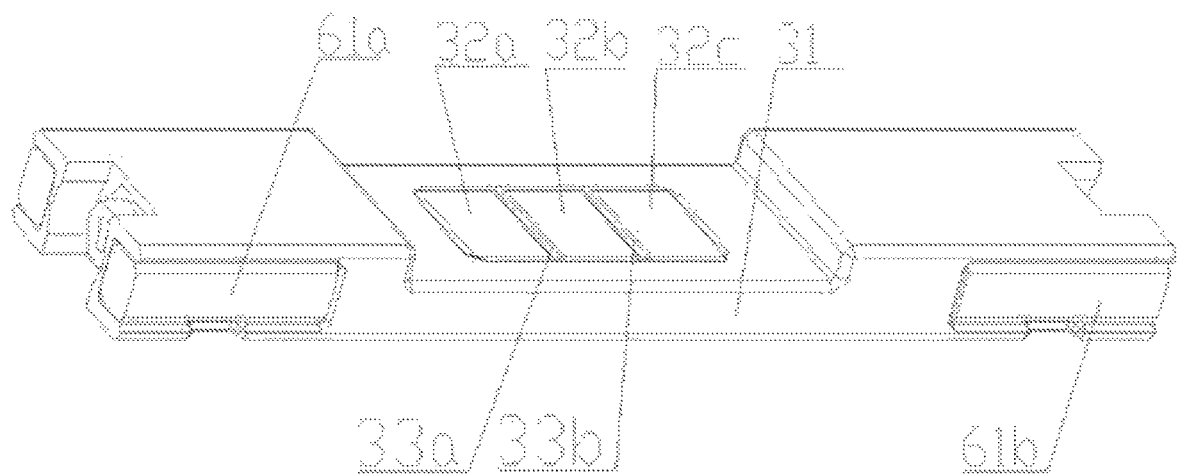
FIG. 6 is a structural schematic diagram of a counterweight installed with a vibrating block and a first balancing magnet according to the second embodiment of the present application.

FIG. 6 shows a structure of a counterweight installed with a vibrating block and a first balancing magnet according to the second embodiment of the present application. As shown in FIG. 6, a vibrating block consisting of three permanent magnets 32a, 32b, 32c and two magnetic yokes 33a, 33b is fixed and disposed in the counterweight 31, and two pairs of first balancing magnets 61a, 61b are respectively disposed at four corners of the counterweight 31.

In addition, the first balancing magnet and the second balancing magnet may utilize one magnet or a combination of two magnets. For example, each of the second balancing magnets is composed of two magnets with opposite magnetization directions, and the first balancing magnet corresponding thereto is also consisting of two magnets with opposite magnetization directions.

Figure 7A:
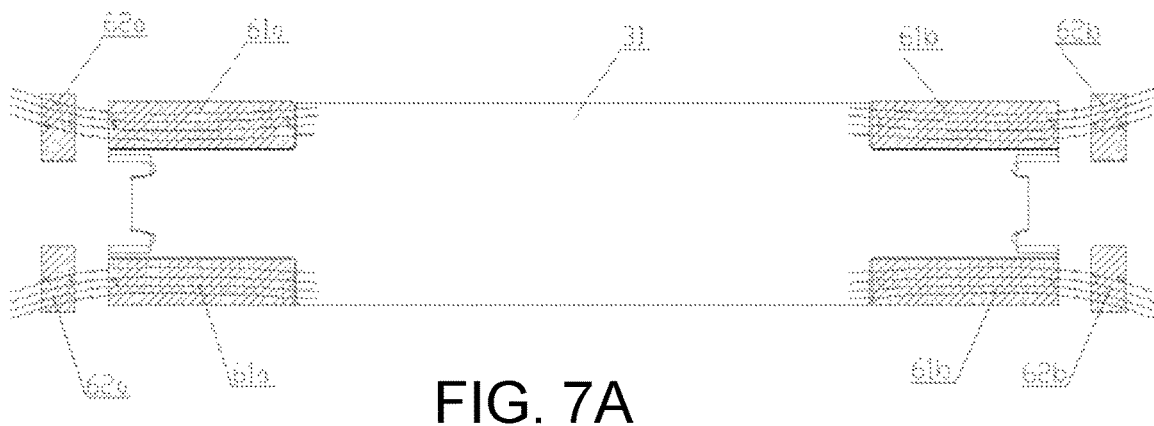
FIG. 7a is a schematic diagram of the operation principle of a magnetic balance guided mechanism according to the second embodiment of the present application.
Figure 7B:
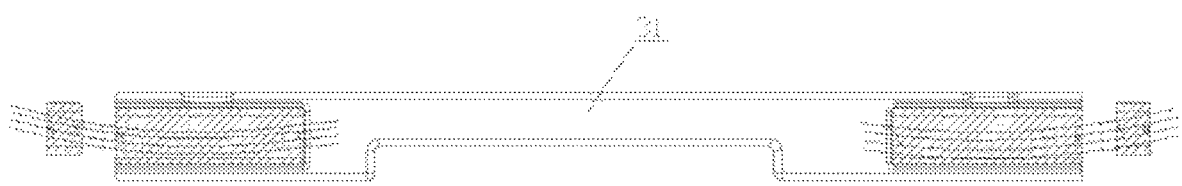
FIG. 7b is a schematic diagram of the operation principle of the magnetic balance guided mechanism according to the second embodiment of the present application.

The principle of magnetic balance of the magnetic balance guided linear vibration motor according to the second embodiment of the present application is shown in FIG. 7a and FIG. 7b. In particular, FIG. 7a and FIG. 7b show the operation principle of the magnetic balance guided mechanism according to the embodiment of the present application from two viewpoints of the top view and the side view, respectively.

As shown in FIG. 7a and FIG. 7b, two pairs of four first balancing magnets 61a, 61b are respectively fixed at four corners of the counterweight 31, and two pairs of four second balancing magnets 62a, 62b respectively disposed at the four corners on vibration space edge (the inner walls of the upper case) apply a balanced attractive force to the counterweight, such that the counterweight maintain balance during the reciprocating movement in the vibration space.

In addition, in order to avoid collision of the balancing magnet in the magnetic balance guide mechanism during the vibration of the vibrator, a buffer cushion may be provided on the housing at a position between the second balancing magnets 62a, 62b and the first balancing magnets 61a, 61b, to protect the magnetic balance guide mechanism of the motor and improve stability.

The counterweight 31 can be manufactured by utilizing high-density metal material such as tungsten steel block or nickel steel block or nickel-tungsten alloy, to increase the vibration force and make the vibration of the electronic product stronger.

In order to facilitate the assembly of the first balancing magnet on the counterweight, in the first and second embodiments shown in FIG. 1 and FIG. 2, the four corners where the two ends of the counterweight are in contact with the two vertical sidewalls are respectively provided with a balance positioning space for accommodating the first balancing magnet, and this balance positioning space can be integrally formed or can be formed by removing material during the manufacturing of the counterweight. Four first balancing magnets can be fixed in the balance positioning spaces on the four corners of the counterweight in manner of glue coating or laser welding and the like.

In the first and second embodiments shown in FIG. 1 and FIG. 2, the limiting mechanisms 53a, 53b are respectively fixed on the upper case 1, and two vibration guide shafts 51a, 51b are respectively fixed at two ends of the counterweight 31.

In this way, the vibrating block brings the counterweight 31 and the vibration guide shafts 51a, 51b fixed at two ends of the counterweight 31 to vibrate within a range defined by the guide hole, under the applied magnetic field generated by the stator after the stator is electrified. The limiting springs 52a, 52b sleeved respectively on the vibration guide shafts 51a, 51b are respectively restricted between the counterweight 31 and the corresponding limiting mechanisms 53a, 53b so as to provide elastic restoring force for the vibration of the vibrator.

Obviously, the vibration amplitude of the vibrator determines the depth that the vibration guide shafts penetrate into the guide holes, the depth that the end of the vibration guide shafts which penetrate into the guide holes distance from the bottom of the guide holes, and the width that the edge of the avoidance structure distance from the outer edge of the stator. In the embodiments shown in FIG. 1, FIG. 2, the horizontal distances between the magnetic yokes and the magnetic cores corresponding to the magnetic yokes are within a numerical range of 0.1 mm-0.3 mm, that is to say, the horizontal distance from the center line of each magnetic yoke to the center line of the magnetic core of the corresponding (i.e., closest) stator is 0.1-0.3 mm, thus the depth that the corresponding vibration guide shaft penetrates into the guide hole, the depth that the end of the vibration guide shaft which penetrates into the guide hole distance from the bottom of the guide hole, and the width that the edge of the avoidance structure distance from the outer edge of the stator should be slightly larger than 0.2 mm.

In addition, it is also possible to provide a shaft sleeve 54 at a entrance of the guide hole, so as to reduce the friction between the vibration guide shaft and the guide hole and improve product quality from the perspective of reducing the contact area between the vibration guide shaft and the guide hole and increasing the smooth and wear-resistance degree of the contact surface between the shaft sleeve and the guide hole and the like. In FIGS. 1 and 2, only the shaft sleeve 54 disposed on the limiting mechanism 53b is illustrated, and a same shaft sleeve is also provided at the corresponding position on the limiting mechanism 53a, but cannot be observed due to the problem of illustrated angle.

In the embodiment shown in FIG. 1 and FIG. 2, the vibrating block is embedded and fixed in the counterweight to bring the counterweight to vibrate horizontally. In particular, an avoidance structure for avoiding the stator is provided in the middle of the counterweight, and a groove for accommodating the vibrating block is provided on a center of the avoidance structure on the counterweight. In the specific assembly process, the operator may firstly fix the permanent magnet and the magnetic yoke constituting the vibrating block together, then fix the whole vibrating block in the groove in manner of glue coating or laser welding and the like.

In addition, the magnetic balance guided motor provided by the present application further comprises a flexible circuit board (PFCB) 7 (as illustrated in FIG. 1), and the stator is fixed on the FPCB 7, and a coil lead of the stator is connected to an external circuit through a circuit on the FPCB 7, wherein the FPCB 7 is fixed to the upper case 1 and the rear cover 2 can be fixed to the FPCB 7 in manner of snap-fitting.

It should be noted that, in order to more clearly illustrate the structure of the magnetic balance guided linear vibration motor provided by the present application, the combination structure shown in FIG. 2 is a combination structure after the flexible circuit board is removed.

It can be seen from the above description of the embodiment that, in addition to the existing mechanical balance guide mechanism which provides a balance for the reciprocating movement of the vibrator in the vibration space, the magnetic balance guided linear vibration motor provided by the present application further incorporates a magnetic balance guide mechanism, and utilizes the interaction force of the balancing magnet disposed at the fixed point to provide balance for the vibrations of the vibrator. The structure design of the magnetic balance guided mechanism according to the application can not only avoid the wear and deformation of components in the mechanical balance guide mechanism, but also effectively reduce the noise caused by maintaining the mechanical balance and improve the quality of the motor.

In addition, the magnetic balance mechanism in the present application can also provide push-pull force to the vibrator in addition to achieving balance by means of magnetic force.

Furthermore, those skilled in the art should understand that the magnetic balance guided mechanism according to the present application can be applied not only to a motor, but also to other products that need to maintain balance of components.

The magnetic balance guided linear vibration motor according to the present application is described by way of example with reference to the accompanying drawings. However, those skilled in the art should understand that various modifications may be made to the magnetic balance guided linear vibration motor according to the above-described present application without departing from the scope of the present application. Therefore, the protection scope of the present application should be determined by the contents of the appended claims.

What is claimed is:

1. A magnetic balance guided linear vibration motor comprising a housing, a vibrator, and a stator fixedly connected to the housing, wherein the vibrator comprises a counterweight and a vibrating block embedded and fixed in the counterweight,
   wherein a pair of first balancing magnets are respectively provided on vertical sidewalls at two ends of the counterweight;
   a pair of second balancing magnets corresponding to the first balancing magnets are respectively provided on the housing at positions corresponding to the two ends of the counterweight; and
   the second balancing magnets and the corresponding first balancing magnets are attracted to each other.

2. The magnetic balance guided linear vibration motor according to claim 1, wherein,
   a buffer cushion is provided on the housing at a position between the second balancing magnets and the first balancing magnets.

3. The magnetic balance guided linear vibration motor according to claim 1, wherein,
   balance positioning spaces are respectively provided at corners where the two ends of the counterweight are in contact with the two vertical sidewalls, and
   the first balancing magnets are fixed in the balance positioning spaces in manner of glue coating or laser welding.

4. The magnetic balance guided linear vibration motor according to claim 3, wherein,
   vibration guide shafts and limiting springs are provided on centers of the two ends of the counterweight, and the limiting springs are sleeved on the vibration guide shafts respectively,
   limiting mechanisms are provided on the housing at positions corresponding to the vibration guide shafts and the limiting springs, and the limiting springs are restricted between the counterweight and the limiting mechanisms, and
   guide holes for reciprocating movements of the vibration guide shafts are provided in the limiting mechanisms, and the second balancing magnets are disposed symmetrically with the guide holes, and the second balancing magnets are disposed in the limiting mechanism or disposed between the limiting mechanism and the first balancing magnets.

5. The magnetic balance guided linear vibration motor according to claim 1, wherein,
   the first balancing magnets and the second balancing magnets are permanent magnets, electromagnets, or any combination of permanent magnets and electromagnets.

6. The magnetic balance guided linear vibration motor according to claim 1, wherein,
   an avoidance structure for avoiding the stator is provided in the middle of the counterweight,
   a groove for accommodating the vibrating block is provided on a center of the avoidance structure on the counterweight, and
   the vibrating block is fixed in the groove in manner of glue coating or laser welding.

7. The magnetic balance guided linear vibration motor according to claim 1, wherein,
   the vibrating block comprises at least three permanent magnets disposed adjacent to each other and adjacent ends of the permanent magnets have the same polarities, and magnetic yokes are provided between adjacent permanent magnets, and
   the stator comprises coils and magnetic cores disposed in the coils respectively,
   the magnetic yokes and the magnetic cores are alternately arranged, and
   magnetization directions of the permanent magnets are perpendicular to axial directions of the coils of the stator.

8. The magnetic balance guided linear vibration motor according to claim 7, wherein,
   horizontal distances between the magnetic yokes and the magnetic cores corresponding to the magnetic yokes are within a numerical range of 0.1 mm to 0.3 mm, and
   the magnetic cores are all located at positions where the corresponding magnetic yokes are far away from a center of the vibrator.

9. The magnetic balance guided linear vibration motor according to claim 1, wherein,
   the counterweight is a tungsten steel block, a nickel steel block or a nickel-tungsten alloy block.

10. The magnetic balance guided linear vibration motor according to claim 1, further comprising a flexible circuit board, wherein
    the stator is fixedly connected to the housing through the flexible circuit board, and
    a coil lead of the stator is connected with an external circuit through a circuit on the flexible circuit board.

* * * * *